US005982602A

United States Patent [19]

Tellas et al.

[11] Patent Number: 5,982,602

[45] Date of Patent: *Nov. 9, 1999

[54] SURGE PROTECTOR CONNECTOR

[75] Inventors: Ronald L. Tellas, Highland, Ind.; Randall L. Grigoletti, Frankfort; Brian E. Clay, Manhattan, both of Ill.

[73] Assignee: Andrew Corporation, Orland Park, Ill.

[ * ] Notice: Under 35 U.S.C. 154(b), the term of this patent shall be extended for 901 days.

[21] Appl. No.: 08/489,256

[22] Filed: Jun. 14, 1995

Related U.S. Application Data

[62] Division of application No. 08/133,678, Oct. 7, 1993, abandoned.

[51] Int. Cl.[6] .......... H02H 1/00

[52] U.S. Cl. .......... 361/119; 361/56; 361/111; 361/118

[58] Field of Search .......... 361/54, 56, 111, 361/117, 118, 119; 439/578, 583, 620; 333/260, 245

[56] References Cited

U.S. PATENT DOCUMENTS

| | | | |
|---|---|---|---|
| 3,289,117 | 11/1966 | Kearns et al. . | |
| 3,323,083 | 5/1967 | Ziegler | 333/260 |
| 3,663,901 | 5/1972 | Forney, Jr. | 333/97 R |
| 4,046,451 | 9/1977 | Juds et al. . | |
| 4,359,764 | 11/1982 | Block | 361/119 |
| 4,525,690 | 6/1985 | De Ronde . | |
| 4,554,608 | 11/1985 | Block . | |
| 4,985,800 | 1/1991 | Feldman et al. | 361/113 |

FOREIGN PATENT DOCUMENTS 2092319 1/1971 France .

OTHER PUBLICATIONS

Suhner EMP Protectors Catalog, Huber and Suhner AG, Microwave Components, Herisau, Switzerland, p. 43.

Written Explanation and Drawing of T–shaped Surge Protector manufactured by Huber and Suhner AG of Switzerland.

W. Leuenberger: "Schutz von HF_Geräten vor den Einwirkungen des EMP," Mikrowellen Magazin, vol. 11, No. 3, 1985, p. 246XP002055475.

*Primary Examiner*—Stephen W Jackson
*Attorney, Agent, or Firm*—Arnold White & Durkee

[57] ABSTRACT

A surge protector connector comprises a surge protector having a front plate, a rear plate, and hollow cylindrical body bridging the front and rear plates. A coaxial cable connector interface extends from the front plate, and the connector interface is constructed and arranged to detachably engage with a mating coaxial cable connector at the end of a first coaxial cable. A cable attachment interface extends from the rear plate, and the cable attachment interface is constructed and arranged to attach directly to a prepared end of a second coaxial cable free of another coaxial cable connector interface. The surge protector connector further includes coaxial inner and outer conductors extending through the hollow cylindrical body and extending between the cable attachment interface and the coaxial cable connector interface. The surge protector includes a curvilinear quarter-wavelength shorting stub having a first portion extending in a generally radial direction from the inner conductor through a gap in the outer conductor and a second portion extending in a generally annular direction circumscribing the outer conductor between the outer conductor and the cylindrical body.

41 Claims, 4 Drawing Sheets

SURGE PROTECTOR CONNECTOR

This application is a continuation of application Ser. No. 08/133,678, filed Oct. 7, 1993 now abandoned.

FIELD OF THE INVENTION

The present invention relates generally to surge protectors and coaxial cable connectors, and, more particularly, relates to a combined assembly which functions as both a surge protector and a coaxial cable connector.

BACKGROUND OF THE INVENTION

A surge protector is a device placed in an electrical circuit to prevent the passage of dangerous surges and spikes that could damage electronic equipment. One particularly useful application of surge protectors is in antenna transmission and receiving systems. In such antenna systems, a surge protector is generally connected in line between a main feeder coaxial cable and a jumper coaxial cable. During normal operation of the antenna system, microwave and radio frequency signals pass through the surge protector without interruption. When a dangerous surge occurs in the antenna system, the surge protector prevents passage of the dangerous surge from one coaxial cable to the other coaxial cable by diverting the surge to ground.

One type of surge protector for antenna systems has a tee configuration including a coaxial through-section and a straight coaxial stub connected perpendicular to a middle portion of the coaxial through-section. One end of the coaxial through-section is adapted to interface with a mating connector at the end of the main feeder coaxial cable, while the other end of the coaxial through-section is adapted to interface with a mating connector at the end of the juniper coaxial cable. Both the coaxial through-section and the straight coaxial stub include inner and outer conductors. At the tee junction between the coaxial stub and the coaxial through-section, the inner and outer conductors of the coaxial stub are connected to the respective inner and outer conductors of the coaxial through-section. At the other end of the straight coaxial stub, the inner and outer conductors of the coaxial stub are connected together creating a short. The short is indirectly connected to a grounding device, such as a grounded buss bar, by some sort of clamp.

The physical length from the junction at one end of the coaxial stub and the short at the other end of the coaxial stub is approximately equal to one-quarter of the center frequency wavelength for a desired narrow band of microwave or radio frequencies. This desired band of operating frequencies travels entirely through the coaxial through-section virtually unaffected by the discontinuities associated with the coaxial stub. Undesired low frequencies which do not meet the wavelength criterium, i.e., surges, do not pass entirely through the coaxial through-section. Instead, these low frequencies travel from the coaxial through-section to the tee junction and through the coaxial stub to the short, where the surge is passed to ground by some sort of grounding device.

A drawback of the above tee-shaped surge protector is that the mating ends of the coaxial through-section necessitate the use of coaxial cable connectors on both the main feeder cable and the jumper cable. As stated above, the ends of the coaxial through-section are designed to mate with coaxial cable connectors of the respective main feeder cable and jumper cable.

Another drawback of the tee-shaped surge protector is that the tee configuration makes the surge protector relatively bulky. This bulkiness, in turn, makes it difficult to mount several such surge protectors side-by-side in an antenna system requiring more than one surge protector. A related drawback of the tee-shaped surge protector is that it is difficult to install the surge protector because the short at the end of the coaxial stub must be indirectly connected to a grounding device by a clamp or the like. The use of a clamp to connect the short to a grounding device increases the amount of equipment required for installation. In addition, when several surge protectors are mounted side-by-side, the respective clamps of these surge protectors tend to physically interfere with one another.

Accordingly, there exists a need for a surge protector connector which overcomes the above-noted drawbacks associated with the tee-shaped surge protector.

SUMMARY OF THE INVENTION

An object of the present invention is to provide a surge protector connector which functions as both a coaxial cable connector and as a surge protector. Since the assembly is attached directly to either the main feeder cable or the jumper cable, a separate surge protector is not required between the main feeder cable and the jumper cable.

Another object of the present invention is to provide a surge protector connector which is compact and easy to install.

Yet another object of the present invention is to provide a surge protector connector which has a wider bandwidth of passable frequencies than that of the tee-shaped surge protector, thereby making the electrical performance better than that of the tee-shaped surge protector.

Other objects and advantages of the invention will be apparent from the following detailed description and the accompanying drawings.

In accordance with the present invention, the foregoing objects are realized by providing a surge protector connector, comprising a surge protector having a hollow cylindrical body with opposing ends; a coaxial cable connector interface extending from one of the opposing ends, the connector interface constructed and arranged to detachably engage with a mating coaxial cable connector at the end of a first coaxial cable; and a cable attachment interface extending from the other of the opposing ends, the cable attachment interface constructed and arranged to attach directly to a prepared end of a second coaxial cable free of another coaxial cable connector interface.

DETAILED DESCRIPTION OF THE PREFERRED EMBODIMENT

Figure 1:
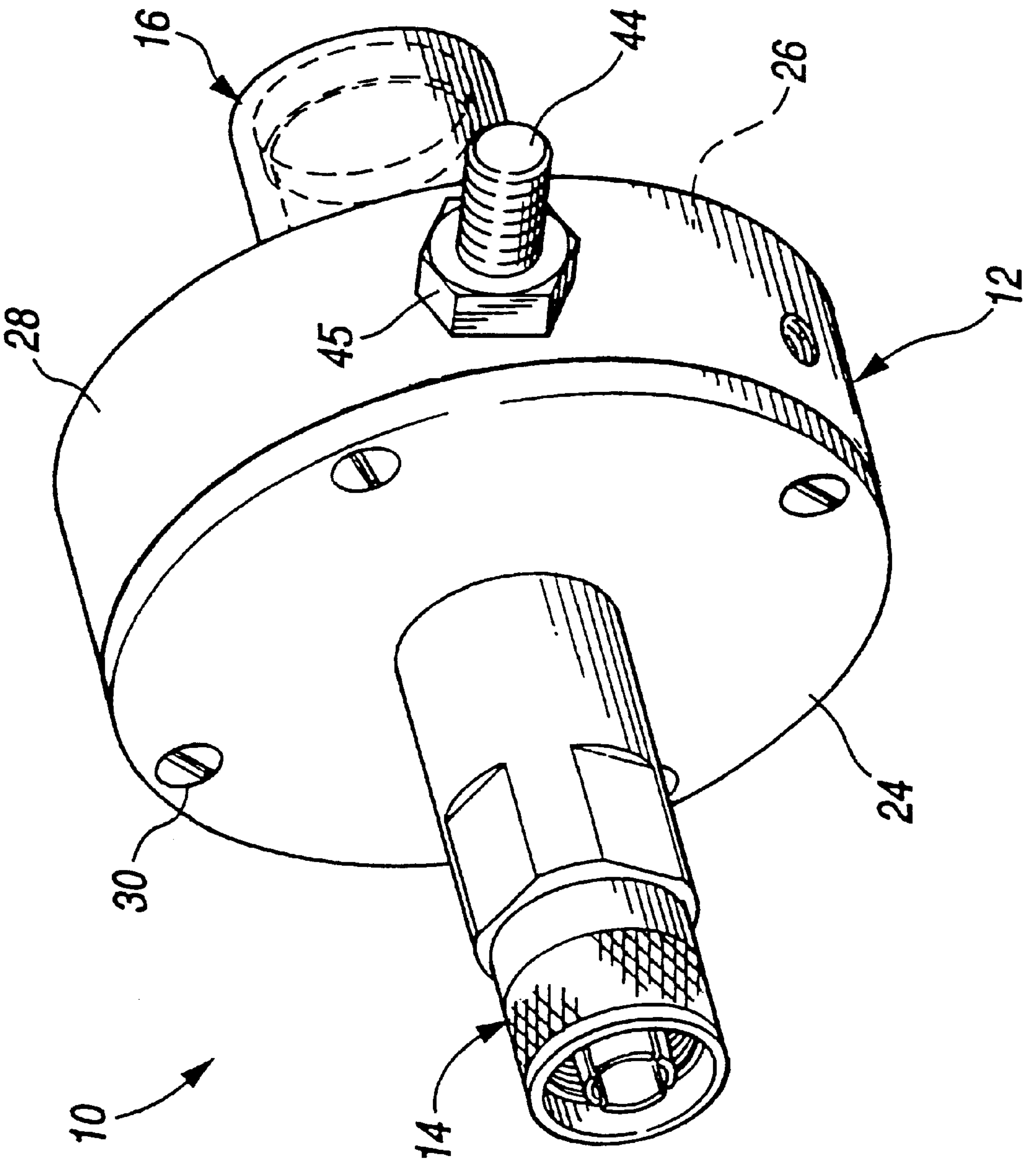
FIG. 1 is a perspective view of a surge protector connector embodying the present invention.

While the invention is susceptible to various modifications and alternative forms, a specific embodiment thereof has been shown by way of example in the drawings and will be described in detail. It should be understood, however, that it is not intended to limit the invention to the particular form described, but, on the contrary, the intention is to cover all modifications, equivalents, and alternatives falling within the spirit and scope of the invention as defined by the appended claims.

Figure 2:
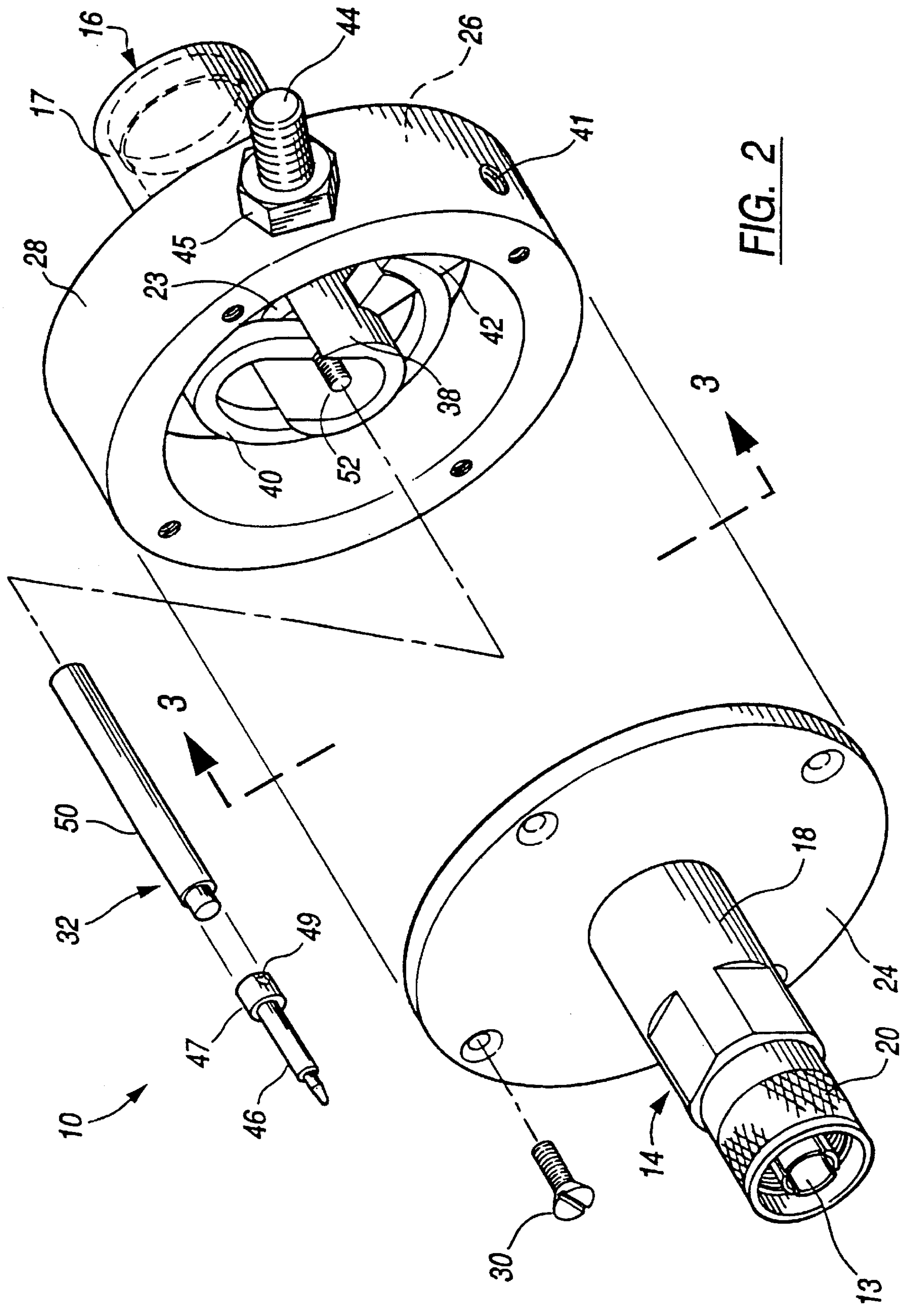
FIG. 2 is an exploded perspective view of the surge protector connector in FIG. 1.
Figure 3:
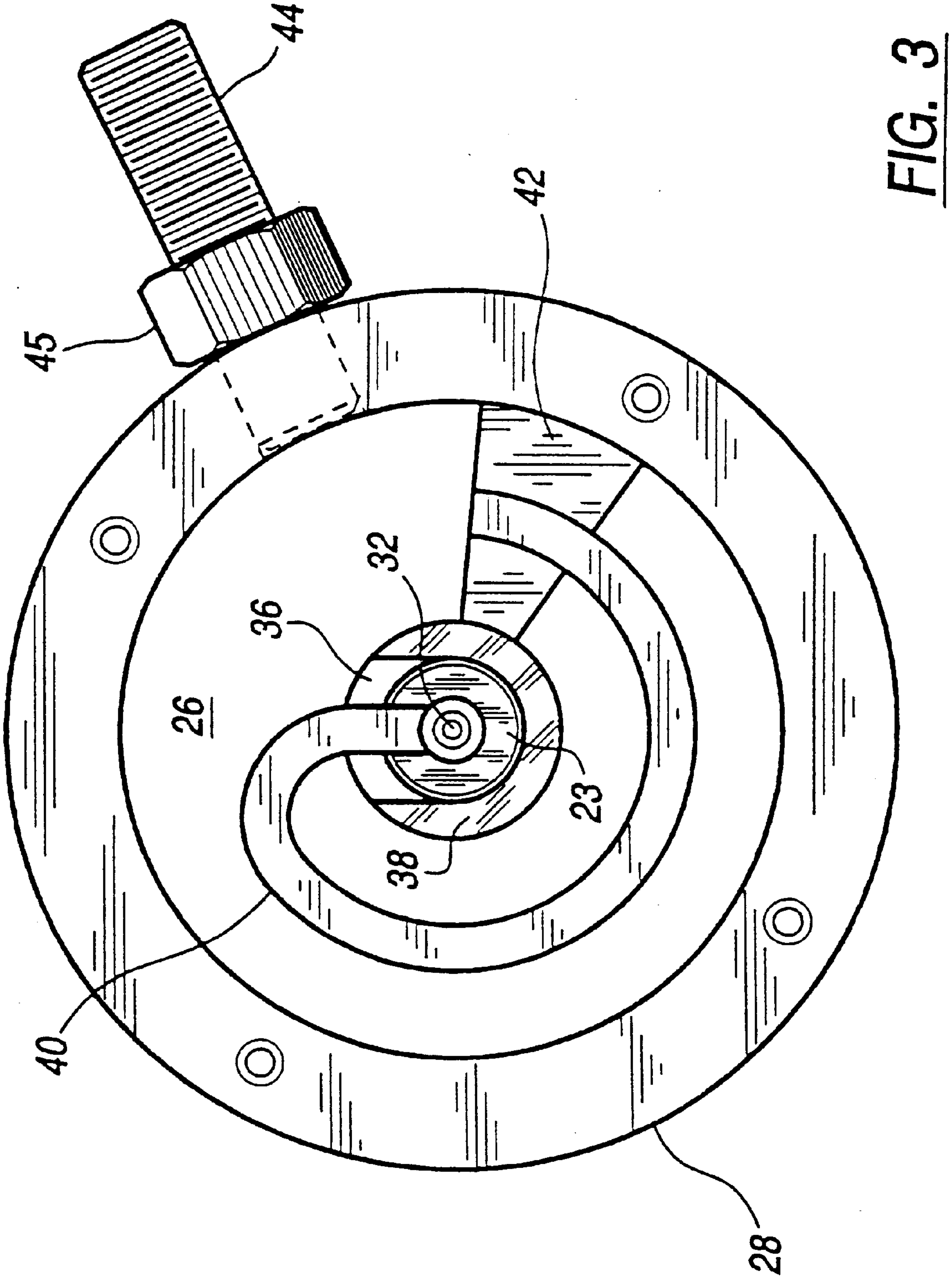
FIG. 3 is a section taken generally along the line 3—3 in FIG. 2.

Turning now to the drawings, FIGS. 1 and 2 illustrate a surge protector connector 10 including a surge protector 12 connected between a coaxial cable connector interface 14 and a cable attachment interface 16. The coaxial cable connector interface 14 is used to detachably interlock the surge protector connector 10 to a mating connector of a first coaxial cable (not shown), while the cable attachment interface 16 is used to fixedly attach a second coaxial cable (not shown) to the surge protector connector.

If the interfaces 14, 16 were directly connected to one another, without the surge protector 12 positioned therebetween, the interfaces 14, 16 would form a conventional coaxial cable connector. Although the surge protector connector 10 separates these interfaces 14, 16 from one another by the surge protector 12, the construction of the interfaces 14, 16 is still substantially identical to corresponding portions of a conventional coaxial cable connector. Therefore, the interfaces 14, 16 will not be described herein in detail.

Figure 4:
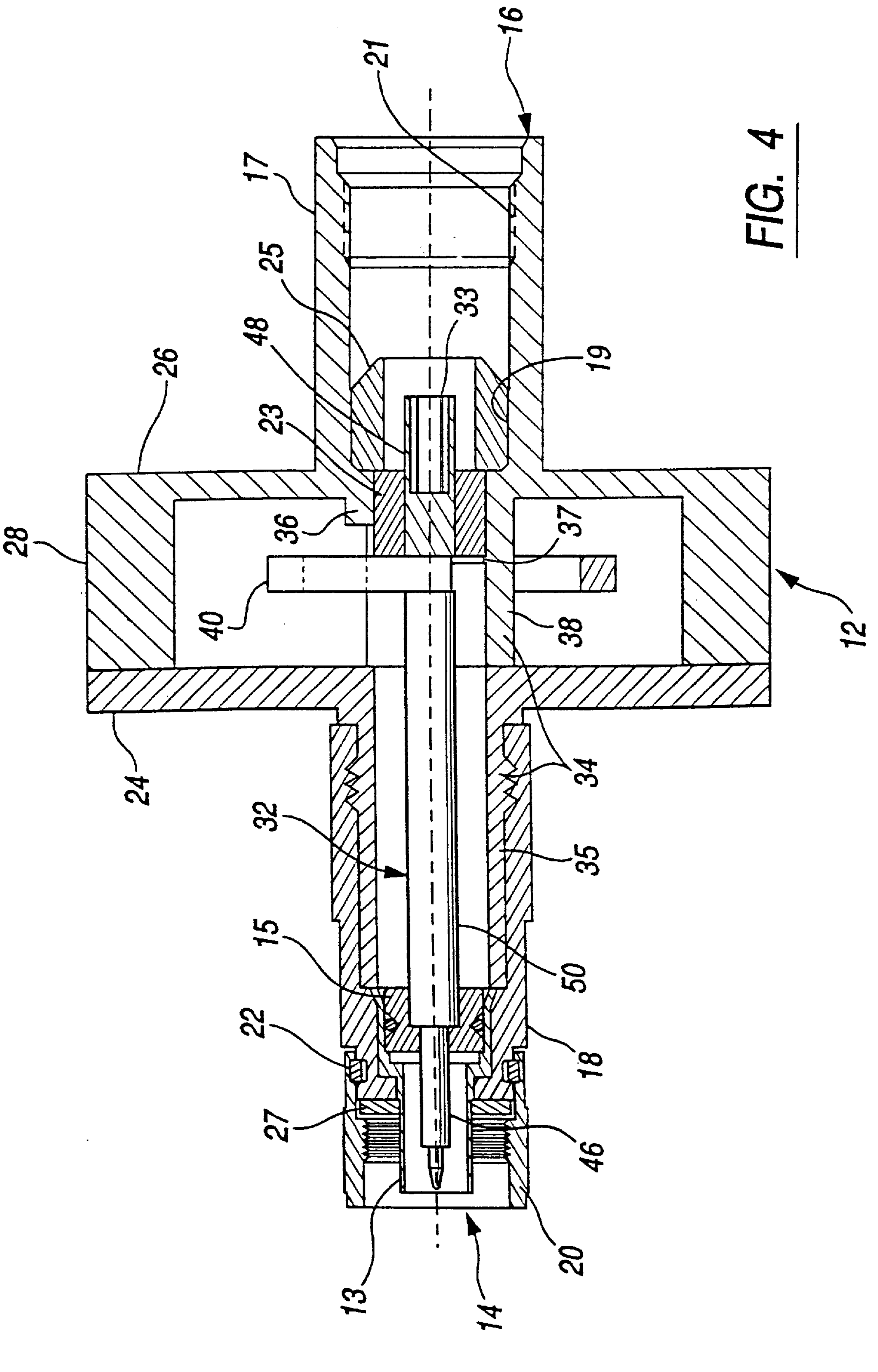
FIG. 4 is a longitudinal sectional view of the surge protector connector in FIG. 1.

It suffices to say the coaxial cable connector interface 14 includes a cylindrical body portion 18, an outer conductor 13, and a coupling nut 20 rotatably mounted about the cylindrical body portion 18. The cylindrical body portion 18 is threadably secured about a front cylindrical section 35 of an outer conductor 34 of the surge protector 12 (FIG. 4). As best shown in FIG. 4, the cylindrical body portion 18 establishes an electrical connection between this cylindrical section 35 of the outer conductor 34 and the outer conductor 13 of the connector interface 14. In addition, when the surge protector connector 10 is in assembled form (FIG. 1), a portion of an inner conductor 32 of the surge protector connector 10 extends through the cylindrical section 35, the cylindrical body portion 18, and the outer conductor 13. A dielectric insulator 15 fixed within the cylindrical body portion 18 centers the inner conductor 32 relative to the outer conductor 13 and, at the same time, electrically isolates the inner conductor 32 from the outer conductor 13. The coupling nut 20 is secured to the body portion 18 by a spring retaining ring 22 which holds the nut 20 captive on the body portion 18 while permitting free rotation of the nut 20 on the body portion 20 (FIG. 4). The coupling nut 20 is provided with threads along the inner surface thereof to permit the coupling nut 20 to threadably engage mating threads along the outer surface of the mating connector of the first coaxial cable (not shown). A gasket 27 is captured within the coupling nut 20 adjacent the cylindrical body portion 18 to provide an insulated sealing surface for the mating connector. While the interface 14 is illustrated as a male interface for receiving a mating female connector therein, the interface 14 may alternatively be designed as a female connector interface. In this case, the cylindrical body portion 18 of the interface 14 is provided with a threaded outer surface for engaging a coupling nut of a mating male connector.

The cable attachment interface 16 is directly attached to the end of the second coaxial cable (not shown) using conventional techniques. In particular, the interface 16 includes a hollow body member 17 having a pair of threaded inner surfaces 19, 21. The threaded surface 19 is employed to threadably secure a properly-sized and threaded flaring ring 25 within the hollow body member 17. To prevent the flaring ring 25 from being threaded beyond a certain position, the outer conductor 34 forms a shoulder which bears against a complementary shoulder on the flaring ring 25. The threaded surface 21 cooperates with a prepared end of the second coaxial cable to secure the end of the second coaxial cable within the hollow body member 17. More specifically, the threaded surface 21 cooperates with a mating threaded surface of a clamping member at the end of the second coaxial cable. To provide an electrical connection between the interface 16 and the inner and outer conductors of the second coaxial cable, the base of the inner conductor 32 extends through the flaring ring 25 and includes a spring-finger socket 33 for receiving and securing the inner conductor of the second coaxial cable. Furthermore, the flaring ring 25 abuts the inner surface of the outer conductor of the second coaxial cable. As previously stated, this flaring ring 25, in turn, abuts the inner surface of the outer conductor 34 of the surge protector 12. Like the dielectric insulator 15 in the interface 14, another dielectric insulator 23 is carried by the inner conductor 32 in order to center the inner conductor 32 within the outer conductor 34 while electrically isolating these elements from one another. The dielectric insulator 23 is held in place by virtue of its abutment against a stub 40 and outer conductor shoulder 37 on one side and the flaring ring 25 on the other side.

Further detail as to the construction of the interfaces 14, 16 and their connection to the respective first and second coaxial cables may be obtained from U.S. Pat. No. 4,046,451 to Juds et al., entitled "CONNECTOR FOR COAXIAL CABLE WITH ANNULARLY CORRUGATED OUTER CONDUCTOR", which is incorporated herein by reference.

The surge protector 12 is positioned and connected between the two interfaces 14, 16. The main body of the surge protector 12 includes the cylindrical section 35, a circular front plate 24, a circular rear plate 26, and a hollow cylindrical conductive body 28 bridging the front and rear plates 24, 26. The interface 14 is threadably mounted about the cylindrical section 35, and the cylindrical section 35 is integrally formed with the front plate 24. The front plate 24, in turn, is connected to one end of the cylindrical body 28 by means such as screws 30, bolts, or the like. Similarly, the cable attachment interface 16 is either soldered to the rear plate 26 or integrally formed therewith, and the rear plate 26, in turn, is integrally formed with the other end of the cylindrical body 28. Both the front plate 24 and the rear plate 26 are apertured to permit signals to pass between the interfaces 14, 16 and the interior of the surge protector 12. The axes of the interfaces 14, 16 and the cylindrical body 28 coincide with one another.

The inner conductor 32 extends along the axis of the surge protector connector 10 from the interface 16, through the hollow cylindrical body 28, and through the interface 14. When the second coaxial cable is fixedly attached to the interface 16, the end of the inner conductor of the second coaxial cable is secured within the spring-finger socket 33 of the inner conductor 32. The inner conductor 32 is centered within the surge protector connector 10 by the dielectric insulator 15 within the cylindrical body portion 18 and the dielectric insulator 23 within the hollow body member 17.

As best shown in FIGS. 2 and 4, the inner conductor 32 is preferably formed from a conventional head 46, a rear section 48, and an extension 50 bridging the head 46 and rear section 48. The head 46 is secured to the extension 50 by placing solder within a hollow base 47 of the head 46 via an aperture 49 and telescoping the base 47 over the end of the extension 50. To engage the extension 50 to the rear section 48, the extension 50 is provided with a threaded female end configured to engage with a threaded male portion 52 of the rear section 48. In the absence of the surge protector 12, the extension 50 would not be required because the interfaces 14, 16 would form a conventional connector. As shown in the foregoing U.S. Pat. No. 4,046,451 to Juds et al., the inner conductor of a conventional connector is much shorter than the inner conductor 32 of the surge protector connector 10. The connection of the surge protector 12 between the interfaces 14, 16 necessitates the lengthening of the inner conductor 32 using the extension 50.

The outer conductor 34 includes the front cylindrical section 35 extending from the front plate 24, and also includes integrally-formed cylindrical and C-shaped sections 36, 38 extending between the front plate 24 and the rear plate 26. These cylindrical and C-shaped sections are integrally formed with the rear plate 26. To provide an electrical connection between the outer conductor 34 and the outer conductor of the second cable engaged within the interface 16, the cylindrical section 36 abuts the flaring ring 25 (FIG. 4) which, in turn, abuts the inner surface of the outer conductor of the second cable. The cylindrical section 36 completely encircles the inner conductor 32, while the C-shaped section 38 partially encircles the inner conductor 32. When the surge protector connector 10 is in the assembled form in FIGS. 1 and 4, the end of the C-shaped section 38 abuts the front plate 24 immediately adjacent to the circular aperture formed therein. Since the front plate 24 and the cylindrical section 35 of the outer conductor 34 are formed as one integral component, an electrical connection is formed between the C-shaped section 38 and the cylindrical section 35 of the outer conductor 34.

To permit a surge to be diverted to a grounding device, the surge protector connector 10 is provided with a curvilinear quarter-wavelength conductive stub 40 longitudinally positioned about halfway between the front and rear plates 24, 26. The curvilinear stub 40 has a rectangular cross-section, and the stub 40 is connected to rear section 50 of the inner conductor 32 by means of either a compressed mechanical fit or solder. The stub 40 initially extends in a radial direction from the inner conductor 32 through the gap in the C-shaped outer conductor 34. After exiting the gap in the C-shaped outer conductor 34, the stub 40 makes a gradual transition from extending in the radial direction to extending in an annular direction at a constant radius about the inner conductor 32. While extending in the annular direction about the inner conductor 32, the stub 40 is radially positioned halfway between the outer surface of the outer conductor 34 and the inner surface of the cylindrical body 28. The stub 40 terminates in a conductive shorting member 42 having a generally triangular shape. The shorting member 42 contains an annular groove or slot sized to permit a pressed mechanical fit of the stub 40 within the shorting member 42. The shorting member 42 extends between the inner surface of the cylindrical body 28 and the outer surface of the outer conductor 34. Thus, the shorting member 42 electrically connects the stub 40 to the conductive cylindrical body 28. In the preferred embodiment, the shorting member 42 is integrally formed with the cylindrical body 28. Alternatively, the shorting member 42 may be a separate insert wedged between the cylindrical body 28 and the outer conductor 34 and held in place by a retaining screw 41 extending from the body 28 into the shorting member 42.

To ground a surge passing through the stub 40 and the shorting member 42 to the conductive body 28, the body 28 is provided with a grounding attachment 44 extending from the outer surface thereof. A hexagonal jam nut 45 is threaded about the grounding attachment until it abuts the outer surface of the cylindrical body 28 so as to prevent movement of the grounding attachment 44 relative to the body 28. The grounding attachment 44 includes threads both to threadably mount the attachment 44 within a tapped hole in the body 28 and to permit easy connection of the surge protector connector 10 to a grounding device such as a grounded buss bar or ground wire. By allowing the surge protector connector 10 to be directly connected to a grounding device, the surge protector connector 10 promotes easy installation of multiple assemblies 10 in an antenna system because there are no separate clamps or the like, as required in the tee-shaped surge protector, to physically interfere with the installation.

During normal "non-surge" operation, the surge protector connector 10 permits signals within a desired narrow frequency band to pass through the surge protector connector 10, between the first and second cables connected thereto, in either direction. The direction of signal travel depends upon whether the surge protector connector 10 is used on the transmission side or receiving side of an antenna system. Signals within the desired band of operating frequencies pass through one of the interfaces 14, 16 (depending on the direction of signal travel) to the surge protector 12. When passing through the surge protector 12, signals within the desired frequency band travel through the surge protector 12, between the inner conductor 32 and the outer conductor 34 (hereafter referred to as the "coaxial through-region"). A portion of the desired signal, however, encounters the curvilinear stub 40 while passing through the surge protector 12. The stub 40 scatters this signal portion radially through the gap in the C-shaped outer conductor 34. Next, this scattered signal portion travels annularly following the path of the stub 40 in the region between the outer surface of the outer conductor 34 and the inner surface of the cylindrical body (hereafter referred to as the "stub region"). After reflecting off the shorting member 42, the scattered signal portion returns along the same path to the region between the inner conductor 32 and the outer conductor 34. Since the physical length of the stub 40 from the junction with the inner conductor 32 to the shorting member 42 is designed to be equal to one-quarter of the center frequency wavelength for the desired band of operating frequencies, the scattered signal portion adds in phase to the non-scattered signal portion and passes through the remainder of the surge protector 12 to the other of the interfaces 14, 16.

When a surge occurs in the antenna system (e.g., from a lightning strike), the physical length of the stub 40 is much shorter than one-quarter of the center frequency wavelength because the surge is at a much lower frequency than the desired narrow band of operating frequencies. In this situation, the surge travels along the inner conductor 32 to the stub 40, through the stub 40 to the shorting member 42, through the shorting member 42 and the body 28 to the grounding attachment 44, and through the grounding attachment 44 to a grounding device connected thereto. Thus, the surge is diverted to ground by the surge protector 12.

Since the stub 40 and its associated stub region are circumscribed about the coaxial through-region, the surge protector connector 10 is more compact than the tee-shaped surge protector, where the stub section extends perpendicular to the coaxial through-section. Due to its compact size, several assemblies 10 may be easily installed with their respective cylindrical bodies 28 adjacent one another without any physical interference between the assemblies 10.

The surge protector connector 10 is designed to provide better electrical performance than existing surge protectors. In particular, the characteristic impedance of the stub region is proportional to the distance between the stub 40 and both the inner surface of the body 28 and the outer surface of the outer conductor 34. Similarly, the characteristic impedance of the coaxial through-region between the inner and outer conductors 32, 34 is proportional to the distance between the inner and outer conductors 32, 34. The surge protector connector 10 is designed so that the foregoing distance associated with the stub region is greater than the foregoing distance associated with the coaxial through-region. As a result, the characteristic impedance of the stub region is greater than the characteristic impedance of the coaxial through-region. In the preferred embodiment, the stub region has a characteristic impedance of about 80 ohms, while the coaxial-through region has a characteristic impedance of about 50 ohms. This differential characteristic impedance provides the coaxial through-region with a wider bandwidth of passable frequencies than the existing tee-shaped surge protector, where the characteristic impedance of the stub section is essentially equal to the characteristic impedance of the coaxial through-section. The wider bandwidth of passable frequencies, in turn, provides the surge protector connector 10 with a lower voltage standing wave ratio ("VSWR") than the tee-shaped surge protector, thereby improving the electrical performance of the surge protector connector 10.

To manufacture the surge protector connector 10, the cylindrical body 28, the cylindrical and C-shaped sections 36, 38 of the outer conductor 34, the shorting member 42, and the rear plate 26 are preferably formed as one integral structure, and the front plate 24 and the cylindrical section 35 are preferably formed as another integral structure. These integral structures are formed by conventional machining or casting techniques. The cylindrical body portion 18 of the interface 14 is threaded over the cylindrical section 35 of the outer conductor 34. The hollow body 17 of the interface 16 is preferably soldered within an aperture formed in the rear plate 26. Alternatively, the hollow body 17 is formed integrally with the rear plate 26. Next, the remaining components of the surge protector 12 and the interface 16 are arranged and connected as described previously. For example, the rear section 50 of the inner conductor 32 is inserted within the dielectric insulator 23 which, in turn, is then inserted through the hollow body 17 into the outer conductor 34. The flaring ring 25 is then threadably engaged to the threaded inner surface 19 of the hollow body 17. The stub 40 is either mechanically fitted or soldered to both the rear section 50 of the inner conductor 32 and the shorting member 42. The grounding attachment 44 is threaded into the cylindrical body 28. After connecting the head 46 of the inner conductor 32 to the extension 50, the extension 50 is threadably engaged to the rear section 48. Finally, the front plate 24 is connected to the end of the cylindrical body 28 by means of screws 30, bolts, or the like.

While the present invention has been described with reference to one or more particular embodiments, those skilled in the art will recognize that many changes may be made thereto without departing from the spirit and scope of the present invention. For example, the interfaces 14, 16 may be reversed so that the cable attachment interface is adjacent the front plate 24, while the coaxial cable connector interface is adjacent the rear plate 26. Also, the sizes of the interfaces 14, 16 may be varied in accordance with the size of the cables connected thereto. Each of these embodiments and obvious variations thereof is contemplated as falling within the spirit and scope of the claimed invention, which is set forth in the following claims.

We claim:

1. A surge protector connector, comprising:

a surge protector having a hollow cylindrical body with opposing ends, said hollow cylindrical body containing an outer conductor having a C-shaped section and an elongated inner conductor centrally disposed within said outer conductor, said hollow cylindrical body further containing a curvilinear conductive stub connected to said inner conductor, a first portion of said stub extending generally perpendicular to said inner conductor through a gap in said C-shaped section of said outer conductor, a second portion of said stub being connected to said first portion and circumscribed about said outer conductor between said outer conductor and said cylindrical body;

a coaxial cable connector interface extending from one of said opposing ends, said connector interface constructed and arranged to detachably engage with a mating coaxial cable connector at the end of a first coaxial cable; and a cable attachment interface extending from the other of said opposing ends, said cable attachment interface constructed and arranged to attach directly to a prepared end of a second coaxial cable free of another coaxial cable connector interface.

2. The surge protector connector of claim 1, wherein said second portion is substantially located at a constant radius about said inner conductor.

3. The surge protector connector of claim 1, wherein said coaxial cable connector interface includes a coupling nut for detachably engaging a mating female connector at the end of the first coaxial cable.

4. The surge protector connector of claim 1, wherein said coaxial cable connector interface includes threads on the outside surface thereof to permit detachable engagement with a mating male connector at the end of the first coaxial cable.

5. The surge protector connector of claim 1, wherein said second portion is substantially located halfway between the outer surface of said outer conductor and the inner surface of said cylindrical body.

6. The surge protector connector of claim 5, wherein the radial distance between said second portion of said stub and the outer surface of said outer conductor is greater than the radial distance between said inner conductor and said outer conductor.

7. The surge protector connector of claim 1, wherein said inner conductor includes a head, a rear section, and an extension bridging said head and said rear section.

8. The surge protector connector of claim 7, wherein said rear section of said inner conductor includes a socket for receiving an inner conductor of the second coaxial cable.

9. The surge protector connector of claim 1, wherein said hollow cylindrical body contains a conductive shorting member extending between said cylindrical body and said outer conductor, an end of said second portion of said stub being connected to said shorting member.

10. The surge protector connector of claim 9, wherein said shorting member has a generally triangular shape, an outer curved surface of said shorting member abutting the inner surface of said cylindrical body and an inner surface of said shorting member abutting the outer surface of said outer conductor.

11. The surge protector connector of claim 9, wherein said shorting member includes a slot sized to receive and maintain said end of said second portion of said stub.

12. The surge protector connector of claim 9, wherein said surge protector includes a grounding attachment connected to said cylindrical body and extending externally therefrom to permit a grounding device to be directly connected to said grounding attachment.

13. A surge protector connector, comprising:

a surge protector having a front plate, a rear plate, and hollow cylindrical body bridging said front and rear plates;

a coaxial cable connector interface extending from said front plate, said connector interface constructed and arranged to detachably engage with a mating coaxial cable connector at the end of a first coaxial cable;

a cable attachment interface extending from said rear plate, said cable attachment interface constructed and arranged to attach directly to a prepared end of a second coaxial cable free of another coaxial cable connector interface; and coaxial inner and outer conductors extending through said hollow cylindrical body and extending between said cable attachment interface and said coaxial cable connector interface, said surge protector including a curvilinear shorting stub having a first portion extending in a generally radial direction from said inner conductor through a gap in said outer conductor and a second portion extending in a generally annular direction circumscribing said outer conductor between said outer conductor and said cylindrical body.

14. The surge protector connector of claim 13, wherein said outer conductor includes a C-shaped section forming said gap through which said first portion of said shorting stub extends.

15. The surge protector connector of claim 13, wherein said coaxial cable connector interface includes a coupling nut for detachably engaging a mating female connector at the end of the first coaxial cable.

16. The surge protector connector of claim 13, wherein said coaxial cable connector interface includes threads on the outside surface thereof to permit detachable engagement with a mating male connector at the end of the first coaxial cable.

17. The surge protector connector of claim 13, wherein said inner conductor includes a head, a rear section, and an extension bridging said head and said rear section.

18. The surge protector connector of claim 17, wherein said rear section of said inner conductor includes a socket for receiving an inner conductor of the second coaxial cable.

19. The surge protector connector of claim 13, wherein said second portion is substantially located at a constant radius about said inner conductor.

20. The surge protector connector of claim 19, wherein said second portion is substantially located halfway between the outer surface of said outer conductor and the inner surface of said cylindrical body.

21. The surge protector connector of claim 20, wherein the radial distance between said second portion of said stub and the outer surface of said outer conductor is greater than the radial distance between said inner conductor and said outer conductor.

22. The surge protector connector of claim 13, wherein said hollow cylindrical body contains a conductive shorting member extending between said cylindrical body and said outer conductor, an end of said second portion of said stub being connected to said shorting member.

23. The surge protector connector of claim 22, wherein said shorting member has a generally triangular shape, an outer curved surface of said shorting member abutting the inner surface of said cylindrical body and an inner surface of said shorting member abutting the outer surface of said outer conductor.

24. The surge protector connector of claim 22, wherein said surge protector includes a grounding attachment connected to said cylindrical body and extending externally therefrom to permit a grounding device to be directly connected to said grounding attachment.

25. A surge protector, comprising:

a hollow cylindrical body with opposing ends;

a coaxial cable connector interface extending from one of said opposing ends and a cable attachment interface extending from the other of said opposing ends;

coaxial inner and outer conductors extending through said hollow cylindrical body and extending between said pair of connector interfaces; and a curvilinear shorting stub having a first portion extending in a generally radial direction from said inner conductor through a gap in said outer conductor and a second portion extending in a generally annular direction circumscribing said outer conductor between said outer conductor and said cylindrical body; and a shorting member bridging the outer surface of said outer conductor and the inner surface of said hollow cylindrical body, one end of said second portion of said shorting stub being connected to said shorting member.

26. The surge protector of claim 25, wherein said outer conductor includes a C-shaped section forming said gap through which said first portion of said shorting stub extends.

27. The surge protector of claim 25, wherein the radial distance between said second portion of said stub and the outer surface of said outer conductor is greater than the radial distance between said inner conductor and said outer conductor.

28. The surge protector of claim 25, further including a grounding attachment connected to said cylindrical body and extending externally therefrom to permit a grounding device to be directly connected to said grounding attachment.

29. The surge protector of claim 28, wherein said grounding attachment includes threads on the outer surface thereof and is threadably engaged within a tapped hole in said cylindrical body.

30. A surge protector, comprising:

a hollow cylindrical body with opposing ends;

a coaxial cable connector interface extending from one of said opposing ends and a cable attachment interface extending from the other of said opposing ends;

coaxial inner and outer conductors extending through said hollow cylindrical body and extending between said pair of connector interfaces; and a curvilinear shorting stub having a first portion extending in a generally radial direction from said inner conductor through a gap in said outer conductor and a second portion extending in a generally annular direction circumscribing said outer conductor between said outer conductor and said cylindrical body; and a grounding attachment connected to said cylindrical body and extending externally therefrom to permit a grounding device to be directly connected to said grounding attachment.

31. A surge protector, comprising:

a hollow body having opposing ends and an outer wall bridging said opposing ends;

coaxial inner and outer conductors extending through said hollow body between said opposing ends; and a curvilinear shorting stub having a first portion extending from said inner conductor through a gap in said outer conductor and a second portion circumscribing said outer conductor between said outer conductor and said outer wall of said body.

32. An integrated surge protector connector for a coaxial cable having inner and outer conductors, said surge protector connector comprising a unitary hollow body having first and second sections, said first section containing coaxial cable connector elements directly engaging the inner and outer conductors of the coaxial cable so that the integrated surge protector connector is directly attached to the coaxial cable without using a separate coaxial cable connector between the integrated surge protector connector and the coaxial cable, said second section containing a shorting stub conductively connected to the inner conductor of the coaxial cable via one of said connector elements so that said shorting stub diverts to ground a dangerous current surge.

33. The integrated surge protector connector of claim 32, wherein said hollow body is composed of a conductive material.

34. The integrated surge protector connector of claim 32, wherein said one of said connector elements includes a spring-finger socket.

35. The integrated surge protector connector of claim 34, wherein said connector elements include a flaring ring.

36. The integrated surge protector connector of claim 35, wherein said flaring ring and said hollow body are formed as separate pieces.

37. The integrated surge protector connector of claim 36, wherein said flaring ring is threadably secured within said hollow body.

38. An integrated surge protector connector for a coaxial cable having inner and outer conductors, said integrated surge protector connector comprising a unitary hollow body having first and second sections, said first section containing (1) an outer conductive element directly engaging the outer conductor of the coaxial cable and (2) an inner conductive element directly engaging the inner conductor of the coaxial cable so that the integrated surge protector connector is directly attached to the coaxial cable without using a separate coaxial cable connector between the integrated surge protector connector and the coaxial cable, said second section containing a shorting stub having a first end conductively connected to said inner conductive element and a second end conductively connected to a grounding attachment so that said shorting stub diverts a dangerous current surge to ground via said grounding attachment.

39. The integrated surge protector connector of claim 38, wherein said unitary hollow body is composed of a conductive material, said grounding attachment is mounted to said hollow body, and said second end of said shorting stub is conductively connected to said grounding attachment via said hollow body.

40. The integrated surge protector connector of claim 39, further including a shorting member conductively connecting said second end of said shorting stub to said hollow body.

41. An integrated surge protector connector for a coaxial cable having inner and outer conductors, said surge protector connector comprising a unitary hollow body having first and second sections, said first section containing coaxial cable connector elements directly engaging the inner and outer conductors of the coaxial cable so that the integrated surge protector connector is directly attached to the coaxial cable without using a separate coaxial cable connector between the integrated surge protector connector and the coaxial cable, said second section containing a shorting stub conductively connected to the inner conductor of the coaxial cable via one of said connector elements, said second section further containing a shorting member connected to said shorting stub and spaced away from said one of said connector elements by approximately one-quarter wavelength or multiple thereof so that said shorting stub diverts a dangerous current surge to ground via said shorting member.

* * * * *